(12) United States Patent
Sueyoshi et al.

(10) Patent No.: US 6,487,612 B1
(45) Date of Patent: Nov. 26, 2002

(54) INFORMATION PROCESSING APPARATUS, INFORMATION PROCESSING METHOD, AND RECORDING MEDIUM

(75) Inventors: Takahiko Sueyoshi, Tokyo (JP); Tomoki Shiono, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/340,568

(22) Filed: Jun. 28, 1999

(30) Foreign Application Priority Data

Jun. 30, 1998 (JP) .......................................... 10-184349

(51) Int. Cl.[7] .............................................. G06F 13/14
(52) U.S. Cl. ................................ 710/14; 710/5; 710/6; 710/7; 710/8; 709/107; 709/318
(58) Field of Search ........................... 710/5–8, 10, 14; 713/1; 709/107, 318

(56) References Cited

U.S. PATENT DOCUMENTS

| | | | |
|---|---|---|---|
| 4,622,013 A | * 11/1986 | Cerchio ...................... 434/118 |
| 5,390,300 A | * 2/1995 | Pribnow et al. ............. 709/103 |
| 5,671,442 A | * 9/1997 | Feeney et al. ................. 710/14 |
| 5,805,162 A | * 9/1998 | Imai et al. .................... 345/672 |
| 6,078,747 A | * 6/2000 | Jewitt .......................... 395/712 |

* cited by examiner

Primary Examiner—Jeffrey Gaffin
Assistant Examiner—Ilwoo Park
(74) Attorney, Agent, or Firm—Frommer Lawrence & Haug LLP; William S. Frommer; Darren M. Simon

(57) ABSTRACT

The present invention relates to an information processing apparatus, an information processing method and a recording medium. The information processing apparatus of the present invention includes a hardware-dependent input means having a normal mode in which an event information associated with a user operation is supplied to an application program through an operating system and a quick action mode in which the event information is directly supplied to another hardware-dependent means previously specified by the application program, and a hardware-dependent output means for executing real-time control on hardware associated with the event information upon reception of the event information directly supplied from the hardware-dependent input means.

9 Claims, 12 Drawing Sheets

INFORMATION PROCESSING APPARATUS, INFORMATION PROCESSING METHOD, AND RECORDING MEDIUM

BACKGROUND OF THE INVENTION

The present invention generally relates to an information processing apparatus, an information processing method, and a medium for making a computer execute a computer program and, more particularly, to an information processing apparatus, an information processing method, and a medium for making a computer execute a computer program, which suppress the delay of processing depending on the state of an OS (Operating System) caused by a user operation.

A BIOS (Basic Input/Output System) is a system program (or a group of system routines) for controlling the basic input/output operations depending on the hardware of a personal computer and installed on its mother board as stored in a ROM (Read Only Memory) or a flash memory for example. The operations in a personal computer to be executed from the time when the personal computer is powered on up to the time when the OS such as Windows 98 (trademark) of Microsoft Corporation starts up are all controlled by the BIOS. In addition to this BIOS, a so-called keyboard BIOS is incorporated in the keyboard controller on the mother board. Therefore, the former is referred to as a system BIOS while the latter is referred to as a keyboard BIOS. These BIOS's and various device drivers depend on the hardware of various devices and so on, so that these BIOS's and various device drivers are sometimes generically referred to as hardware-dependent programs or low-level system programs. The hardware-dependent programs are used herein. By the same token, the operating system is a hardware-independent high-level system program. The operating system is simply referred to as the OS herein. If an application program for executing some processing in response to the pressing of a push button by a user for example is assumed in the above-mentioned personal computer, for example, if the user presses a push button, the occurrence of an operation event for an application program is notified as follows. Namely, when the event detection routine of the keyboard BIOS operating on the personal computer detects an operation event caused by a user operation, the information about the detected event is sent to the OS operating on the personal computer and then to the associated application program through the notification means depending on the OS (for example, a Windows message if the OS is Windows 98).

However, the timing with which an operation event caused by a user operation is detected by the event detection routine of the keyboard BIOS and the associated application program is notified of the detection through the OS may be delayed by an operating state of the OS. For example, it is impossible to execute such real-time processing with a desired timing as that a still picture is captured with a desired timing from a motion picture taken by the CCD video camera or a shutter effect sound is generated in synchronization with this capturing timing.

SUMMARY OF THE INVENTION

It is therefore an object of the present invention to prevent the delay in the processing by the OS for an operator event by making hardware-dependent programs (low-level system programs) such as BIOS's and drivers coordinately handle and complete the processing to be executed real-time in synchronization with the occurrence of an event.

In carrying out the invention and according to one aspect thereof, there is provided an information processing apparatus including: a hardware-dependent input block having a normal mode in which an event information associated with a user operation is supplied to an application program through an operating system and a quick action mode in which the event information is directly supplied to another hardware-dependent block specified by the application program; and a hardware-dependent output block for real-time controlling hardware associated with the event information upon reception of the event information directly from the hardware-dependent input block.

In carrying out the invention and according to another aspect thereof, there is provided an information processing method including the steps of: hardware-dependent inputting having a normal mode in which an event information associated with a user operation is supplied to an application program through an operating system and a quick action mode in which the event information is directly supplied to another hardware-dependent block specified by the application program; and hardware-dependent outputting for real-time controlling hardware associated with the event information upon reception of the event information directly from the hardware-dependent input block.

In carrying out the invention and according to still another aspect thereof, there is provided a recording medium for making a computer execute an information processing program including the steps of: hardware-dependent inputting having a normal mode in which an event information associated with a user operation is supplied to an application program through an operating system and a quick action mode in which the event information is directly supplied to another hardware-dependent block specified by the application program; and hardware-dependent outputting for real-time controlling hardware associated with the event information upon reception of the event information directly from the hardware-dependent input block.

In the above-mentioned information processing apparatus, the hardware-dependent input block is provided with the quick action mode for directly supplying the event information associated with a user operation to another hardware-dependent block specified by the application program, thereby controlling the hardware real-time. Consequently, the processing to be executed real-time in synchronization with the occurrence of an event can be cooperatively completed between hardware-dependent programs such as BIOS's and drivers.

In the above-mentioned information processing method and recording medium, the hardware-dependent input processing step is provided with the quick action mode for directly supplying the event information associated with a user operation to another hardware-dependent block specified by the application program, thereby controlling the hardware real-time. Consequently, the processing to be executed real-time in synchronization with the occurrence of an event can be cooperatively completed between hardware-dependent programs such as BIOS's and drivers.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings.

Figure 1:
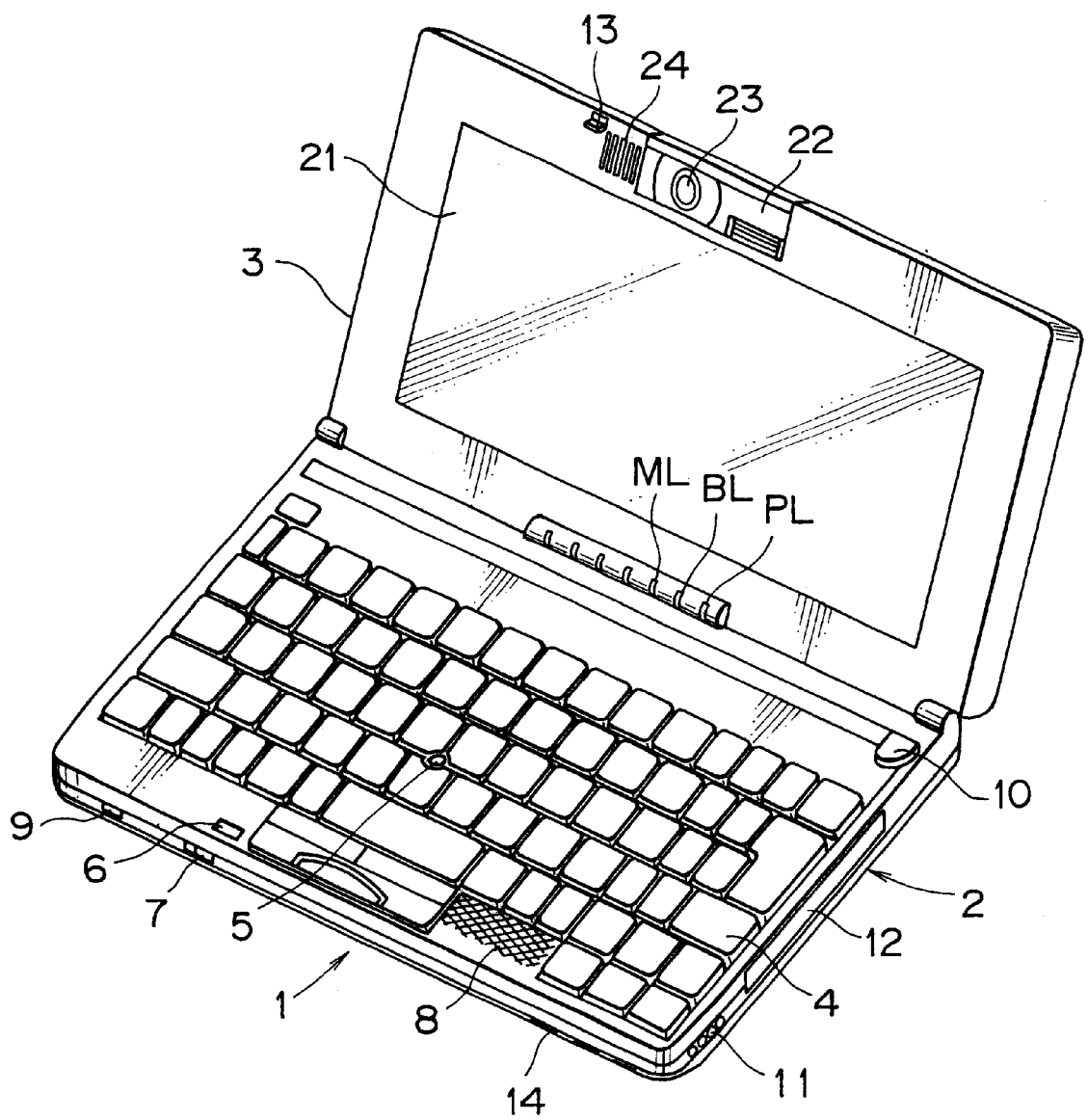
FIG. 1 is a perspective view illustrating a personal computer to which the present invention is applied.
Figure 2:
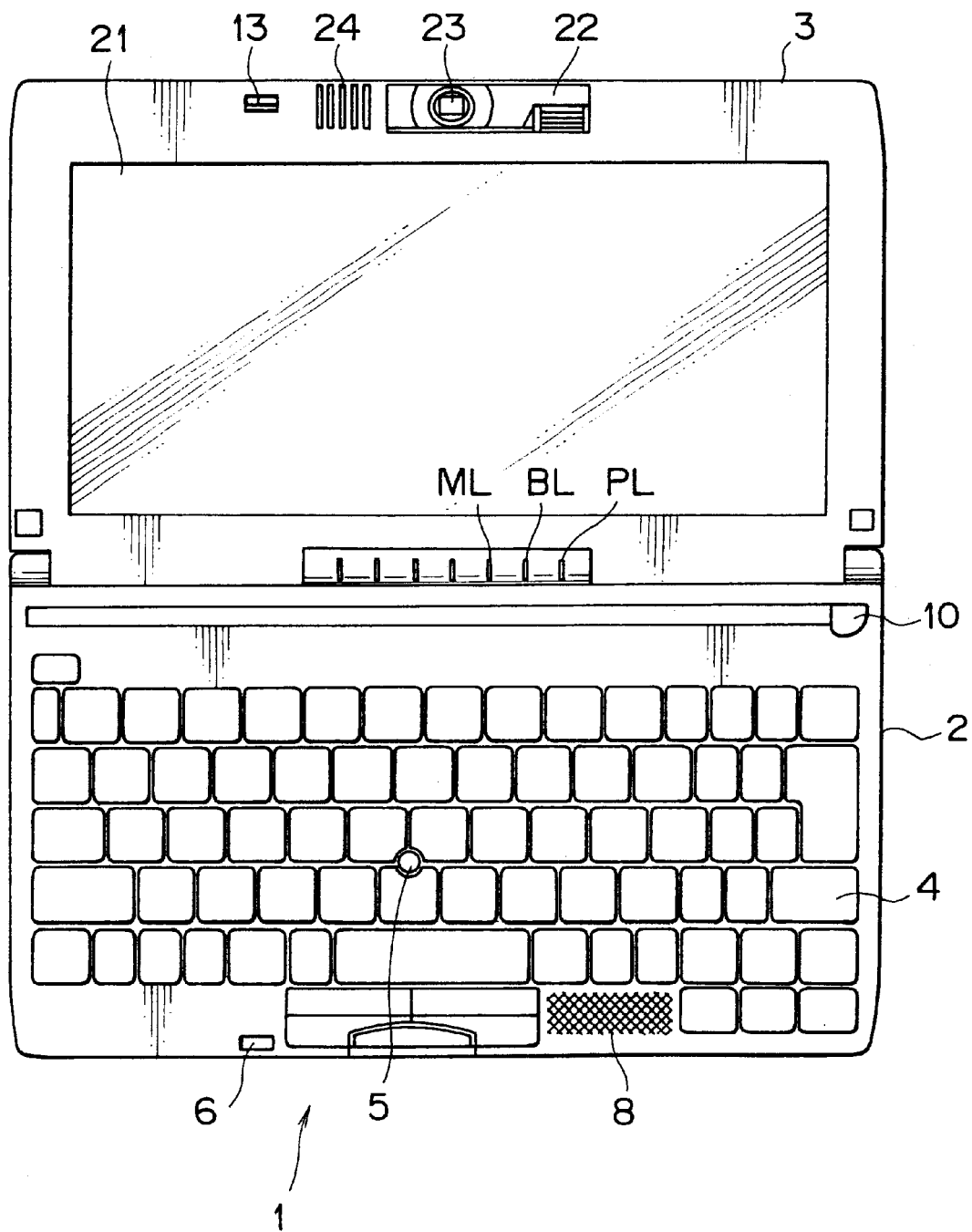
FIG. 2 is a top view illustrating the personal computer shown in FIG. 1.
Figure 3:
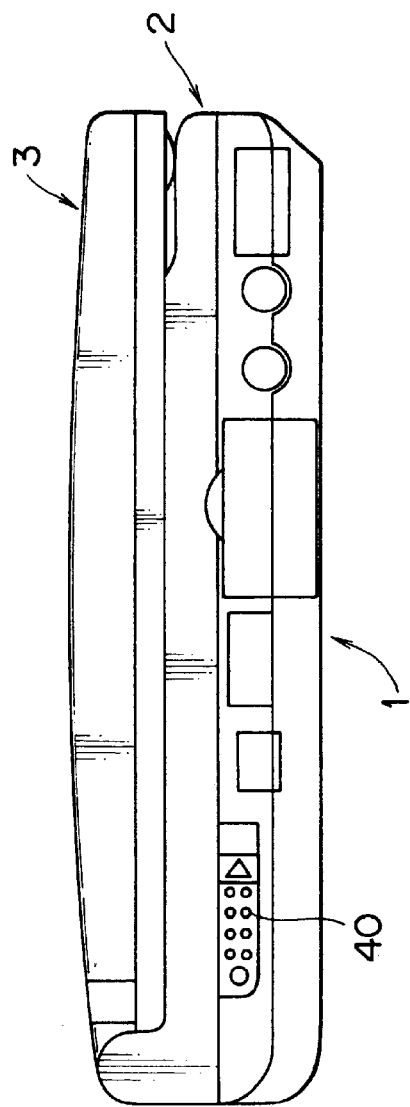
FIG. 3 is a side view illustrating the personal computer shown in FIG. 1.
Figure 4:
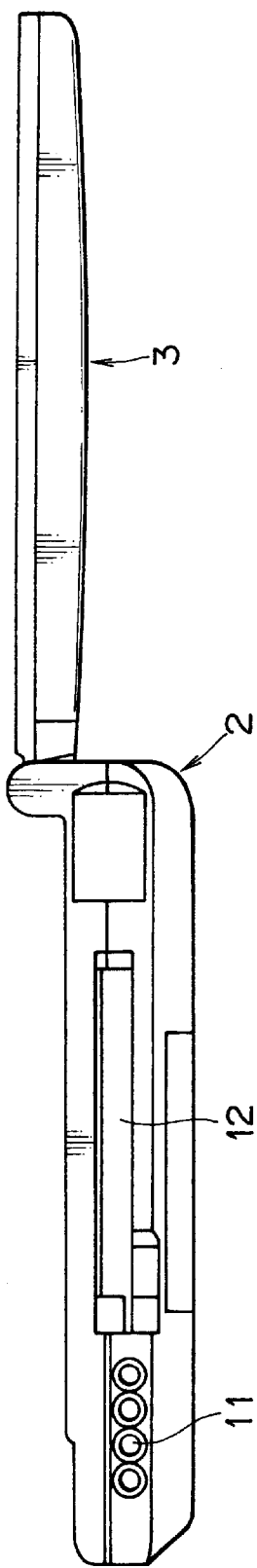
FIG. 4 is another side view illustrating the personal computer shown in FIG. 1.
Figure 5:
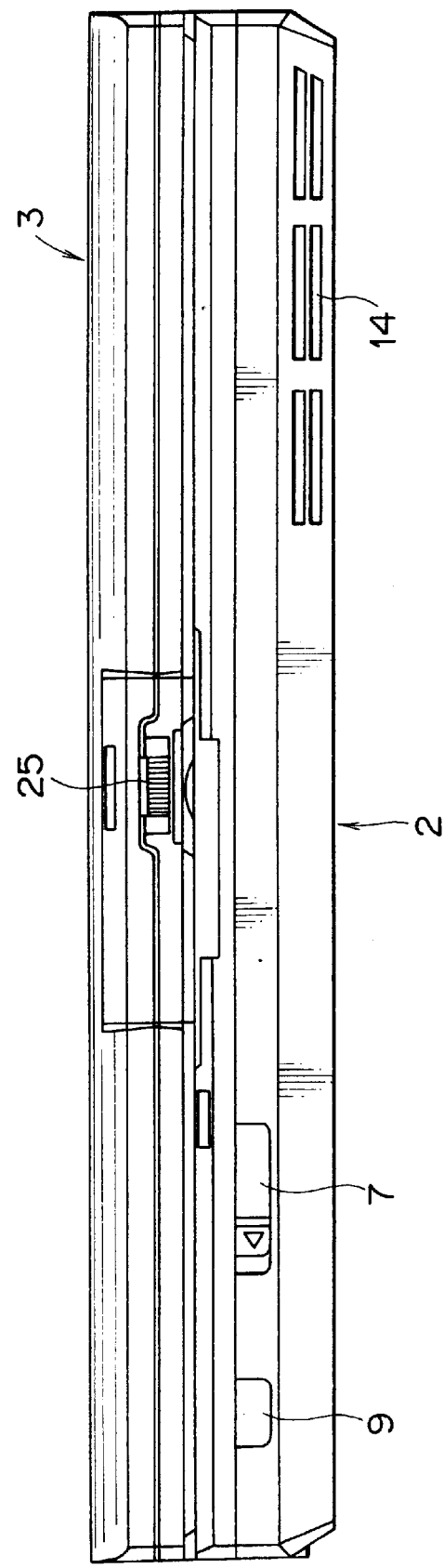
FIG. 5 is an elevational view illustrating the personal computer shown in FIG. 1.
Figure 6:
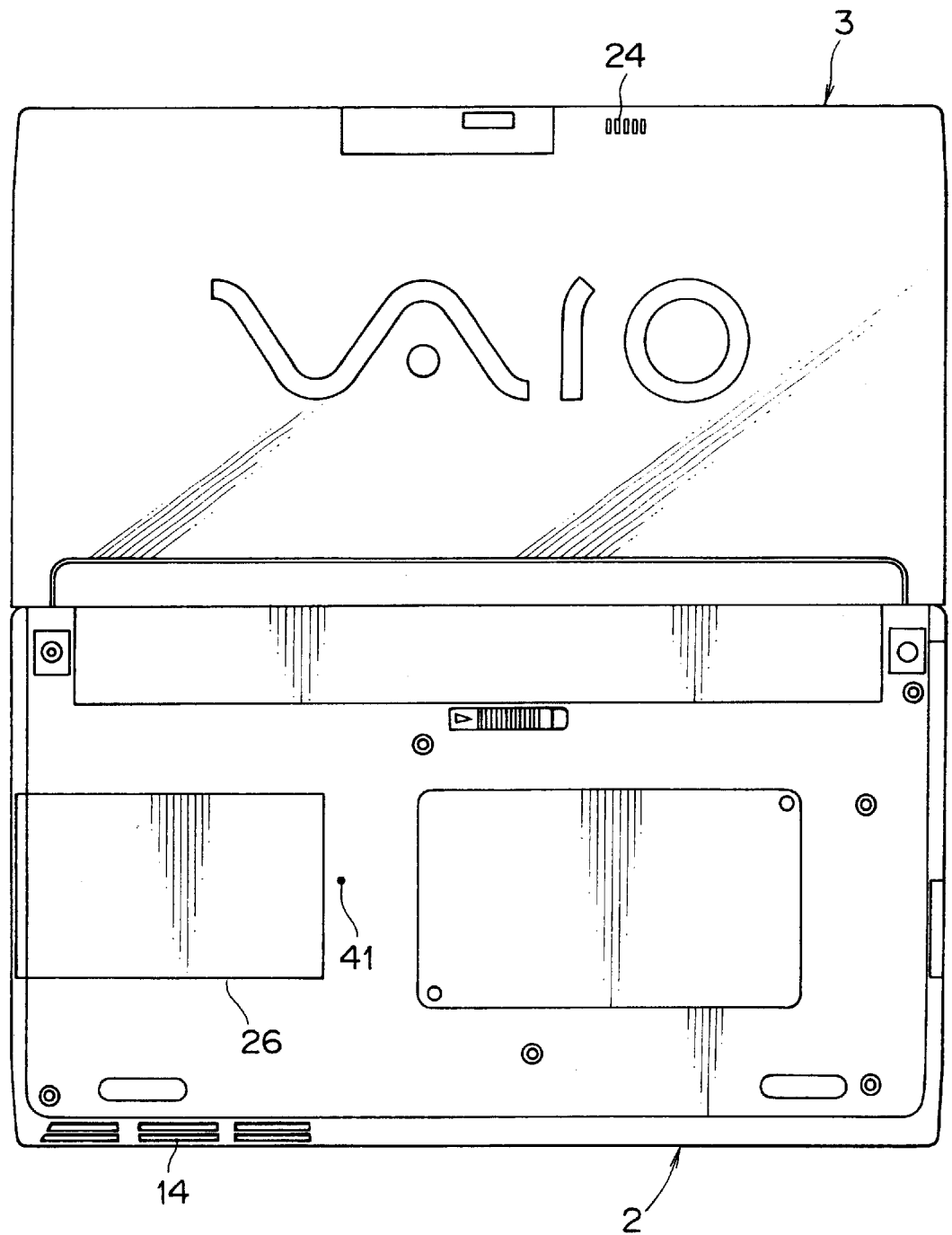
FIG. 6 is a bottom view illustrating the personal computer shown in FIG. 1.

FIGS. 1 through 6 illustrate an exemplary constitution of a portable personal computer practiced as one preferred embodiment of the invention. In the figures, the personal computer 1 is of mini-notebook type, which is basically composed of a main frame 2 and a display block 3 pivotally mounted thereon. FIG. 1 perspectively illustrates the personal computer 1 with the display block 3 open relative to the main frame 2. FIG. 2 is a top view of the personal computer 1 shown in FIG. 1. FIG. 3 is a left side view illustrating the personal computer 1 shown in FIG. 1 with the display block 2 closed against the main frame 2. FIG. 4 is a right side view illustrating the personal computer 1 shown in FIG. 1 with the display block 3 open by 180 degrees relative to the main frame 2. FIG. 5 is a top view illustrating the personal computer 1 shown in FIG. 3. FIG. 6 is a bottom view illustrating the personal computer 1 shown in FIG. 4.

The main frame 2 is arranged on the top thereof with a keyboard 4 that is operated to enter various characters and symbols and a stick-type pointing device 5 that is operated to move a mouse cursor for example. The main frame 2 is further arranged on the top thereof with a speaker 8 for outputting sound and a shutter button 10 that is operated to take a picture through a CCD video camera 23 disposed on the display block 3.

A claw 13 is disposed on the upper end of the display block 3. A hole 6 in which the claw 13 mates is disposed on the main frame 2 at a position that corresponds to the position of the claw 13 when the display block 3 is closed against the main frame 2. A slide lever 7 is disposed on the front face of the main frame 2 in a movable manner along the front face. The slide lever 7 is adapted to latch and unlatch the claw 13 mated in the hole 6. In the unlocked state, the display block 3 can be pivotally moved relative to the main frame 2. A microphone 24 is disposed beside the claw 13. As shown in FIG. 6, the microphone 24 can also pick up sound coming from the back of the personal microcomputer 1.

The front face of the main frame 2 is also disposed with a programmable power key (PPK) 9. On the right-side face of the main frame 2, an exhaust port 11 is disposed as shown in FIG. 4. On the lower portion of the front face of the main frame 2, an intake port 14 is disposed as shown in FIG. 5. To the right of the exhaust port 11, a slot 12 is disposed for accommodating a PCMCIA (Personal Computer Memory Card International Association) card (a PC card in short).

On the top face of the display block 3, an LCD (Liquid Crystal Display) 21 is disposed for displaying images. On the upper end of the display block 3, an imaging block 22 is disposed in a pivotally movable manner relative to the display block 3. To be more specific, the imaging block 22 can pivotally move to any position in a range of 180 degrees at right angles to the vertical direction of the display block 3. The imaging block 22 has the CCD video camera 23.

In the lower portion of the display block 3, a power light PL, a battery light BL, a message light ML, and other light or lights each constituted by an LED (Light Emitting Diode) are arranged, facing the main frame 2. Reference numeral 40 shown in FIG. 3 denotes a power switch disposed on the left side face of the main frame 2. Reference numeral 25 shown in FIG. 5 denotes an adjustment ring for adjusting focus of the CCD video camera 23. Reference numeral 26 shown in FIG. 6 denotes a cover for an opening through which an add-on memory is installed in the main frame 2. Reference numeral 41 denotes a hole through which a pin is inserted to unlatch a claw locking the cover 26 to the main frame 2.

Figure 7:
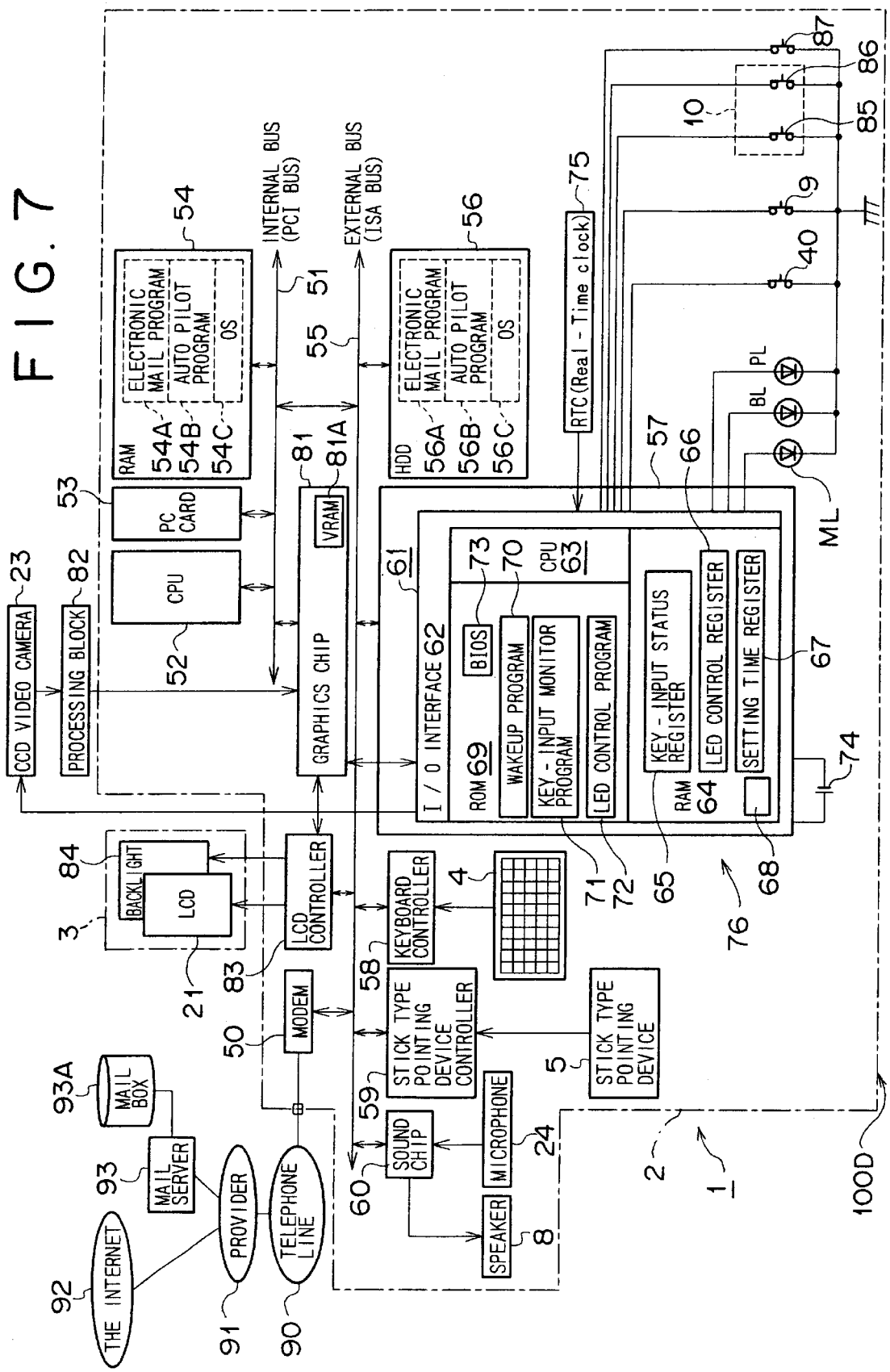
FIG. 7 is a block diagram illustrating an electrical constitution of the personal computer shown in FIG. 1.

FIG. 7 exemplifies the internal constitution of the personal computer 1. As shown, an internal bus 51 is connected to a CPU (Central Processing Unit) 52, a PC card 53 that is inserted as required, a RAM (Random Access Memory) 54, and a graphics chip 81. The internal bus 51 is also connected to an external bus 55. The external bus 55 is connected to the hard disk drive (HDD) 56, an I/O (Input/Output) controller 57, a keyboard controller 58, a stick-type pointing device controller 59, a sound chip 60, an LCD controller 83, and a modem 50.

The CPU 52 controls the above-mentioned components of the personal computer 1. The PC card 53 is inserted to add an optional capability.

The RAM 54 stores, when the personal computer 1 starts, an electronic mail program (an application program) 54A, an auto pilot program (an application program) 54B, and an OS (Operating System) 54C from the HDD 56.

The electronic mail program 54A handles electronic messages transferred from a network through a communication line like telephone line. The electronic mail program 54A has an in-coming mail capturing capability as a particular capability. The in-coming mail capturing capability checks a mail box 93A of a mail server 93 for a mail addressed to that user and, if such a mail is found, captures the same.

The auto pilot program 54B sequentially starts plural preset processing operations (or programs) in a predetermined order.

The OS 54C controls basic computer operations exemplified by Windows 98 (trademark).

The HDD 56 on the external bus 55 stores an electronic mail program 56A, an auto pilot program 56B, and an OS 56C. These programs are sequentially sent into the RAM 54 at the time of booting.

The I/O controller 57 has a microcontroller 61 provided with an I/O interface 62. The microcontroller 61 is constituted by the I/O interface 62, a CPU 63, a RAM 64, and a ROM 69 interconnected with each other. The RAM 64 has a key-input status register 65, an LED control register 66, a setting time register 67, and a register 68. The setting time register 67 is used to start a boot sequence controller 76 when a time (or a boot condition) set by user comes. The register 68 holds the correspondence between a preset operator key combination and an application program to be started. When the user enters this operator key combination, the corresponding application program (for example, the electronic mail program) starts.

The key-input status register 65 holds an operator key flag when the PPK 9 for single-touch operation is pressed. The LED control register 66 controls the turn-on/off of the message light ML that indicates the operating state of the application program (the electronic mail program) held in the register 68. The user can set any desired time to the time setting register 67.

A backup battery 74 is connected to the microcontroller 61, thereby preventing the values set to the registers 65, 66, and 67 from being cleared after the main frame 2 is powered off.

The ROM 69 in the microcontroller 61 stores a wake-up program 70, a key-input monitor program 71, and an LED control program 72 in advance. The ROM 69 is constructed of an EEPROM (Electrically Erasable and Programmable ROM) for example. The EEPROM is known as a flash memory. An RTC (Real-time Clock) 75 for always counting current time is also connected to the microcontroller 61.

The wake-up program 70 stored in the ROM 69 checks, based on the current time data supplied from the RTC 75, whether the time preset to the setting time register 67 has been reached. If the time is found reached, the wake-up program 70 starts a predetermined processing operation (or a predetermined program). The key-input monitor program 71 monitors the pressing of the PPK 9 by the user. The LED control program 72 controls the turn-on/off of the message light ML.

The ROM 69 also stores a BIOS (Basic Input/Output System) 73. The BIOS includes an extended BIOS 54D (refer to FIG. 11), a gist of the claimed invention, in addition to a normal system BIOS for starting up the OS 56C when the personal computer is powered on, and for controlling the transfer of data between an application program and peripheral devices (the display monitor, the keyboard, and the hard disk drive) after the OS has been started up.

The keyboard controller connected to the external bus 55 controls the input made on the keyboard 4. The stick-type pointing device controller 59 controls the input made on the stick-type pointing device 5.

The sound chip 60 captures the input from the microphone 24 and supplies an audio signal to the built-in speaker 8.

The modem 50 connects the personal computer 1 to a communication network 92 such as the Internet or the mail server 93 through a public telephone line 90 or an Internet service provider 91.

Image data captured by the CCD video camera 23 is processed in a processing block 82 to be supplied through a ZV (Zoomed Video) port to the graphics chip 81 connected to the internal bus 51. The graphics chip 81 stores the video data inputted from the CCD video camera 23 through the processing block 82 into a built-in VRAM 81A and reads the stored video data as required and outputs the same to the LCD controller 83. The LCD controller 83 outputs the video data supplied from the graphics chip 81 for display. A back light 84 illuminates the LCD 21 from behind the same.

It should be noted that the internal function of the graphics chip 81 will be further described with reference to FIG. 12.

The power switch 40 turns on/off the power to the personal computer 1. A half-press switch 85 is turned on when the shutter button 10 is pressed to the half position. A full-press switch 86 is turned on when the shutter button 10 is fully pressed. A reverse switch 87 is turned on when the imaging block 22 is rotated 180 degrees (namely, when the CCD video camera 23 is rotated in the direction behind the LCD 21).

Figure 8:
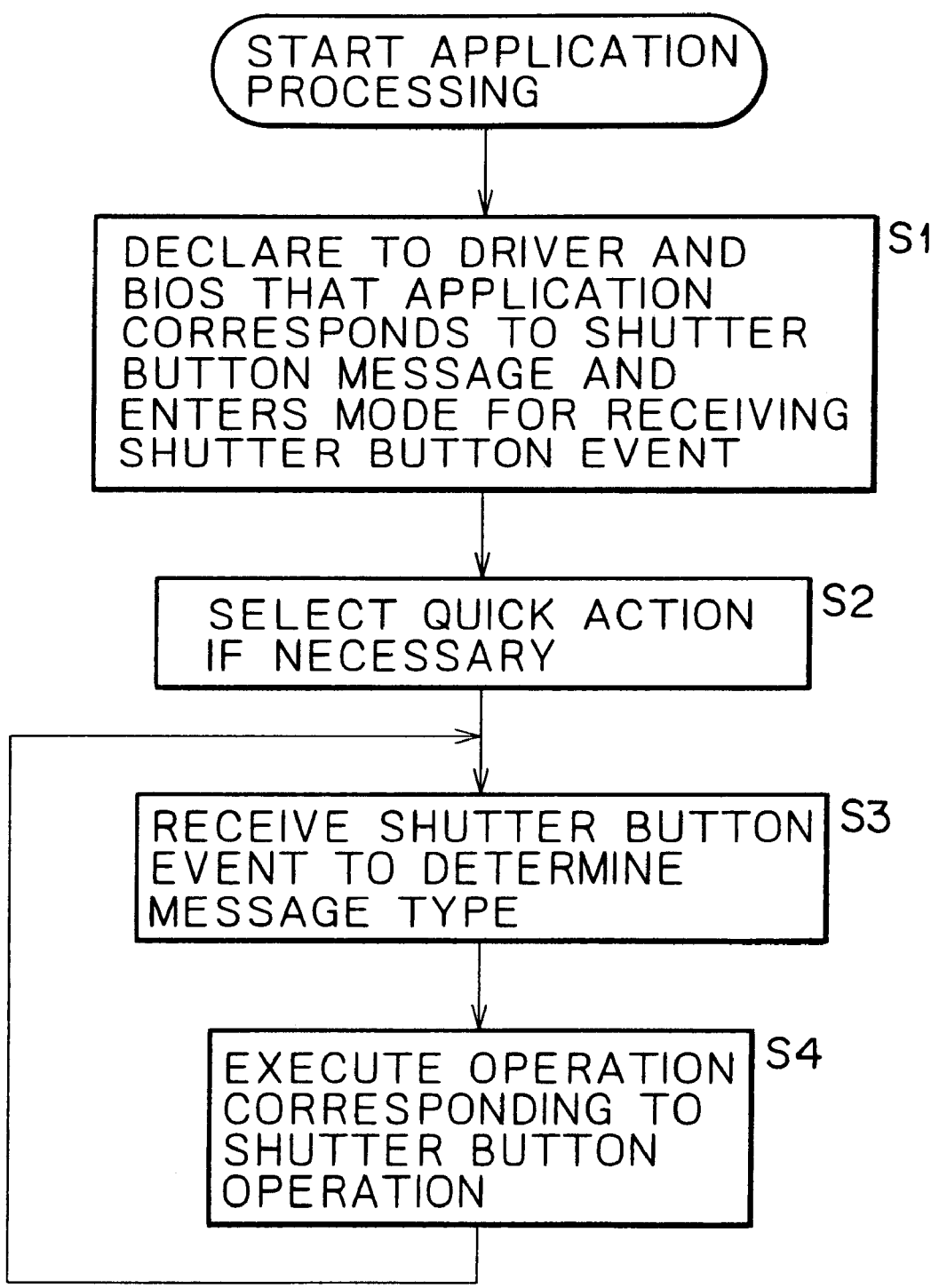
FIG. 8 is a flowchart describing the processing of an imaging application program of the personal computer shown in FIG. 1.
Figure 9:
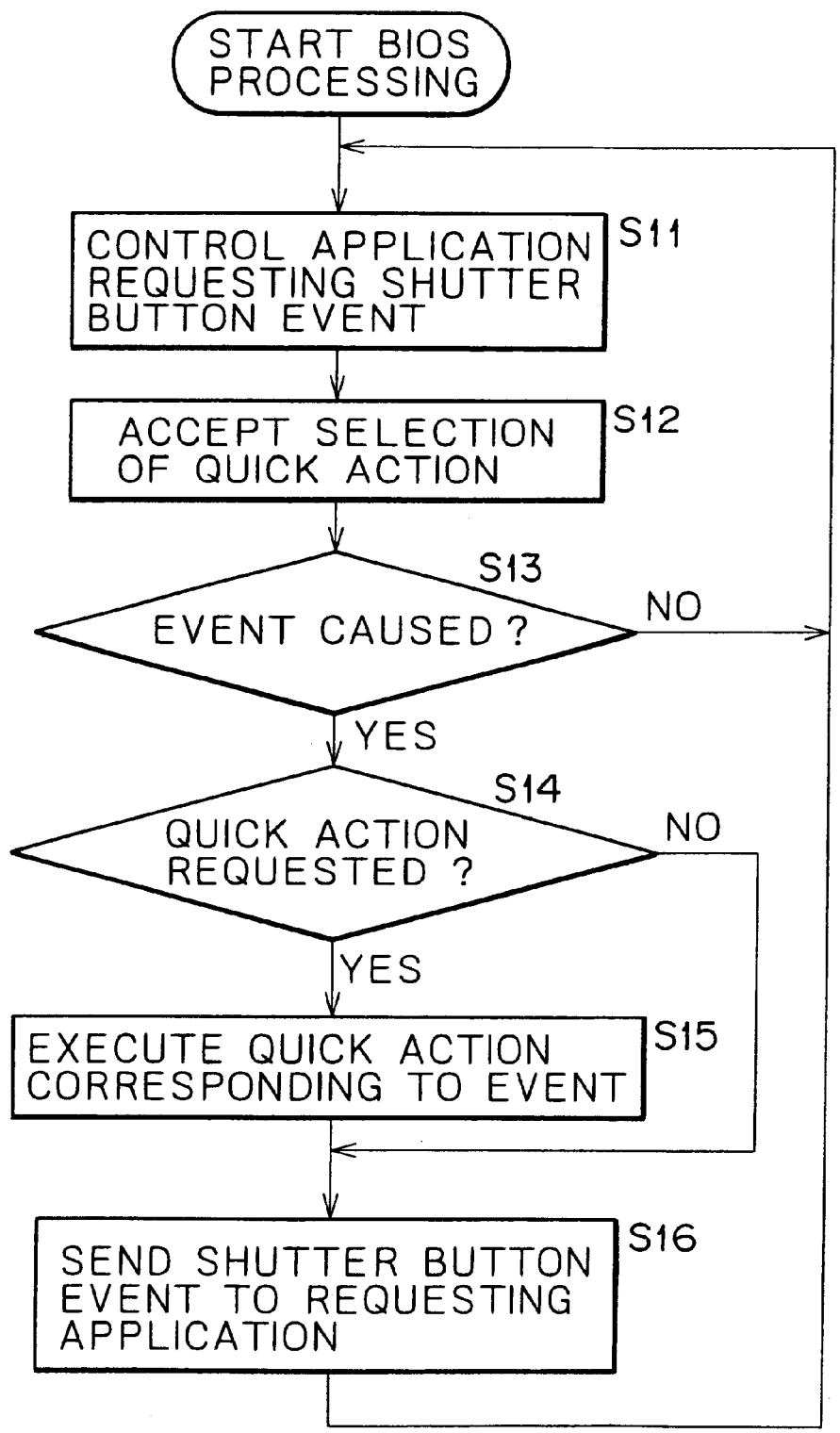
FIG. 9 is a flowchart describing the processing of an extended BIOS of the personal computer shown in FIG. 1.

In the above-mentioned embodiment, an image imaged by the imaging block 22 in synchronization with a user operation of pressing the shutter button 10 is recorded on the hard disk 56. This imaging processing will be described with reference to the flowcharts shown in FIGS. 8 and 9. It should be noted that the application processing shown in FIG. 8 is started when the imaging application program stored on the hard disk 56 is expanded into the RAM 54 and executed as an imaging application program 54P (refer to FIG. 11). The BIOS processing shown in FIG. 9 is started when the extended BIOS 54D (refer to FIG. 11) of the BIOS 73 stored in the ROM 69 is executed by the CPU 52.

In step S1 shown in FIG. 8, the imaging application program 54P tells the extended BIOS 54D that the imaging application corresponds to the shutter button 10 and enters a state for receiving a notification of event information from the extended BIOS 54D.

In step S2, the imaging application program 54P tells the extended BIOS 54D whether a quick action mode is valid or invalid. In the quick action mode, event information associated with the operation of user is directly supplied from the extended BIOS 54D to a camera driver 54E, a video driver 54F, or an audio driver 54G, which will be described later, in synchronization with a time at which the shutter button 10 is pressed. The quick action mode directly transmits the event information to the various drivers without the intervention by the OS 54C. Thus, the hardware can be controlled real-time in synchronization with event occurrence by the cooperation between the hardware-dependent programs such as BIOS's and drivers in a concluded manner.

For example, the above-mentioned novel constitution allows real-time control such that a preview image is frozen when the shutter button 10 is pressed halfway and a shutter effect sound is generated when the shutter button 10 is pressed fully.

If the quick action mode is selected valid by the imaging application program 54P, the extended BIOS 54D executes the processing based on the quick action mode, namely, directly supplies the event information to the video driver 54F through the camera driver 54E when the shutter button 10 is pressed halfway. On the other hand, if the quick action mode is selected invalid, the extended BIOS 54D does not execute the processing based on the quick;action mode.

On the other hand, in step S11 (FIG. 9), the extended BIOS 54D accepts a declaration from the imaging application program 54P (step S1 described above). In step S12, the extended BIOS 54D receives the selection (step S2 described above) of quick action mode from the imaging application program 54P.

In step S13, the extended BIOS 54D monitors the half-press switch 85 and the full-press switch 86 to determine whether the shutter button 10 has been pressed or not (or an event has occurred or not). If the shutter button 10 is not found pressed, the extended BIOS 54D waits until the shutter button 10 is pressed; if the shutter button 10 is found pressed, the processing goes to step S14.

In step S14, the extended BIOS 54D determines whether the quick action mode selection accepted in step S12 is valid or not. If the selection is found not valid (invalid), step S15 is skipped; otherwise, the processing goes to step S15.

In step S15, the extended BIOS 54D executes the quick action corresponding to the event. For example, if the event is half-pressing of the shutter button 10, the preview screen is frozen in synchronization with the half-pressing; if the event is full-pressing of the shutter button 10, a shutter effect sound is generated in synchronization with the full-pressing.

In step S16, the extended BIOS 54D notifies the imaging application program 54P of the event information through the OS 54C.

Referring to FIG. 8 again, the imaging application program 54P receives the event information notification from the extended BIOS 54D (step S16) and determines the type of the event (half-pressing, full-pressing, or releasing).

In step S4, the imaging application program 54P executes the processing corresponding to the event type. For example, if the event is the full-pressing of the shutter button 10, the data of the frozen preview image is appropriately attached with a file name to be stored on the HDD 56.

It should be noted that the processing of this imaging application program 54P continues until a predetermined end operating is performed by the user. The processing of the extended BIOS 54D continues while the personal computer 1 is running.

Figure 10:
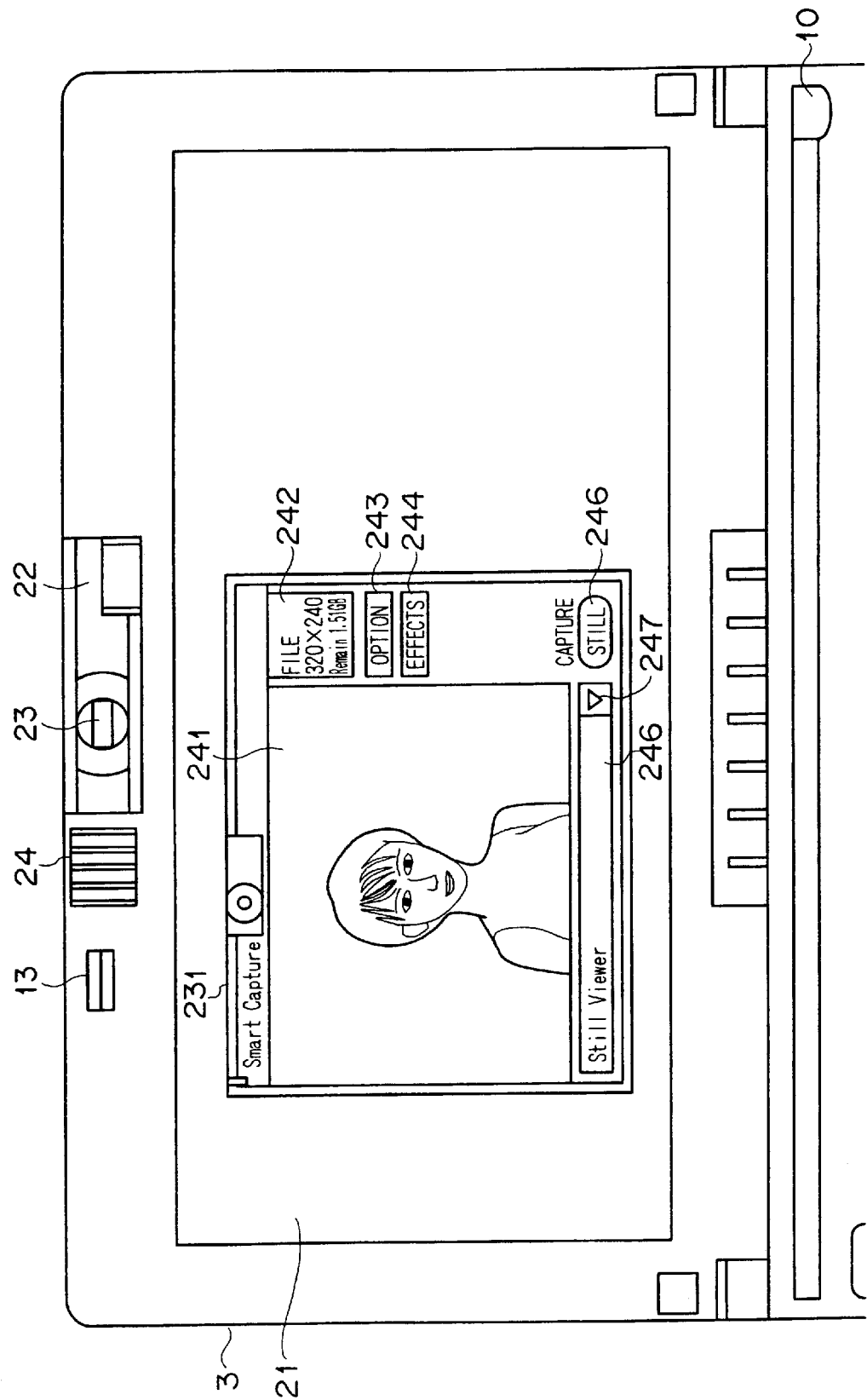
FIG. 10 illustrates a particular display example of the imaging application program of the personal computer shown in FIG. 1.

FIG. 10 illustrates a particular display example of the imaging application program 54P. The following describes Smart Capture (trademark) as an example that works as the imaging application program 54P for capturing an image through the CCD video camera 23.

With Smart Capture being on, the CPU 52 instructs the graphics chip 81 to execute the processing for displaying the image captured through the CCD video camera 23 onto the LCD 21. Namely, the image data captured through the CCD video camera 23 is processed by the processing block 82 in a predetermined manner to be supplied to the graphics chip 81 through the ZV port. The graphics chip 81 temporarily stores the received image data into the VRAM 81A and reads the image data to output the same to the LCD controller 83. The LCD controller 83 outputs the received image data to the LCD 21 (a finder screen 241) for display. Consequently, the image captured through the CCD video camera as shown in FIG. 10 for example is displayed as a motion picture on in a window 231 of Smart Capture.

As shown in FIG. 10, the finder screen 241 is arranged in the window 231. The image captured through the CCD video camera 23 is displayed in the finder screen 241. A status display section 242 displays the status information about the image displayed in the finder screen 241. For example, in the still picture imaging mode, a picture quality (FINE), a picture size (320×240), and a hard disk free space (Remain 1.51 GB) are displayed. In the motion picture imaging mode, a maximum recording length, a current recording time, and a picture size are displayed.

An option button 243 is operated for imaging mode specification for example. An effect button 244 is operated to impart an effect to the image. A capture button 245 is substantially the same as the mechanical shutter button (refer to FIG. 1) in function and operated to capture an image. The word on the capture button 245 is "STILL" for still picture capturing and "VIDEO" for motion picture capturing.

An application selector menu 246 displays the name of an application for processing the shooting image. In the state shown in FIG. 10, Still Viewer (trademark), which is an application program for still image reproduction, is selected. Smart Capture is in the state for supplying the obtained image data to Still Viewer. Therefore, "Still Viewer" is displayed on the application selector menu 264. A button to the right of the application selector menu 246 is operated to switch between applications.

Figure 11:
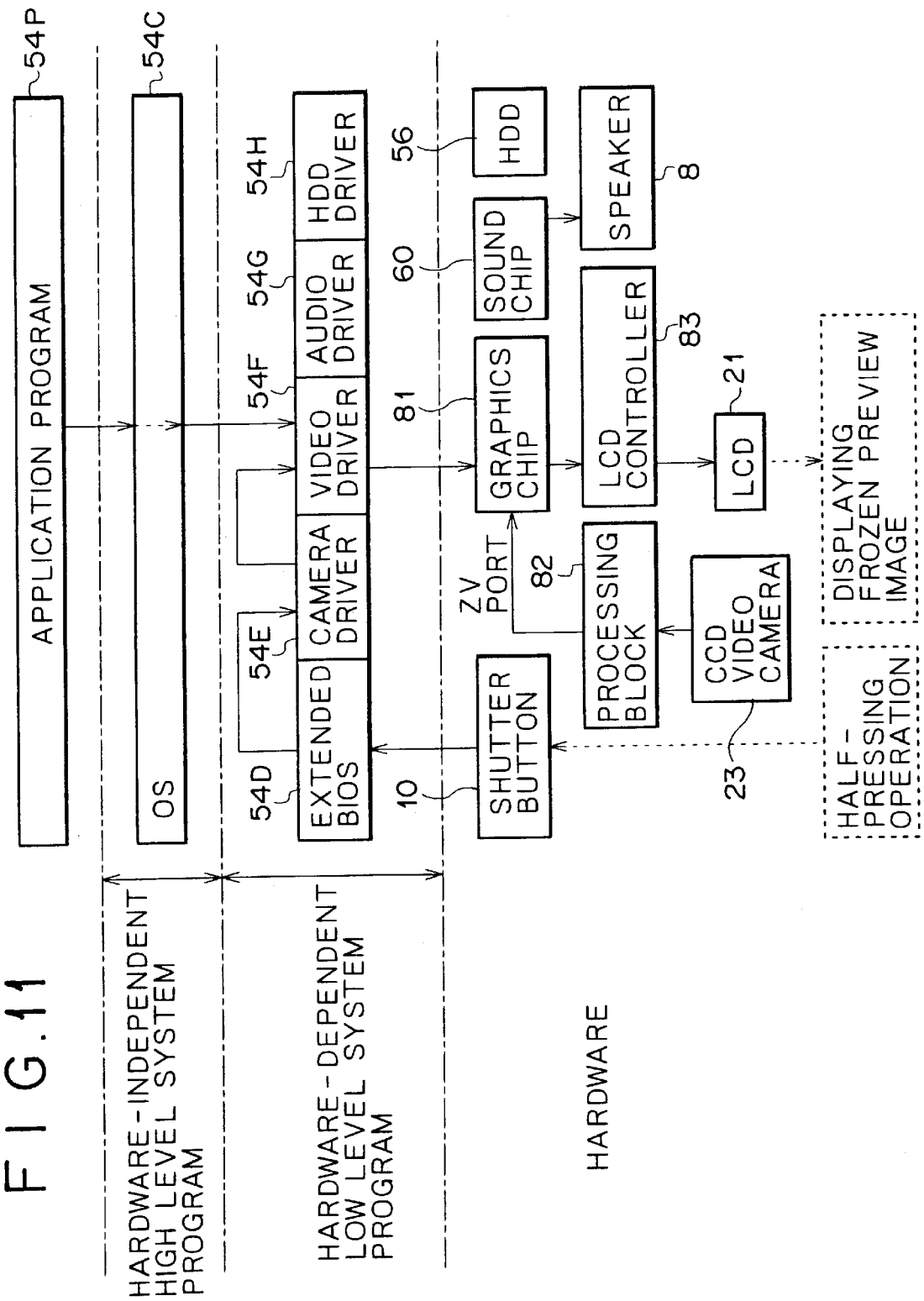
FIG. 11 illustrates the operations of components to be executed when a shutter button of the personal computer shown in FIG. 1 is pressed halfway.

FIG. 11 illustrates the operations of the components to be executed when the shutter button 10 of the personal computer 1 shown in FIG. 1 is pressed halfway. FIG. 12 illustrates a freeze operation of the graphics chip 81 to be executed when the shutter button 10 is pressed halfway.

Referring to these figures, when the shutter button 10 is pressed halfway, the operator event of the half-press switch 85 (refer to FIG. 7) is detected by the extended BIOS 54D and the information about the operator event is supplied to the video driver 54F through the camera driver 54E.

Figure 12:
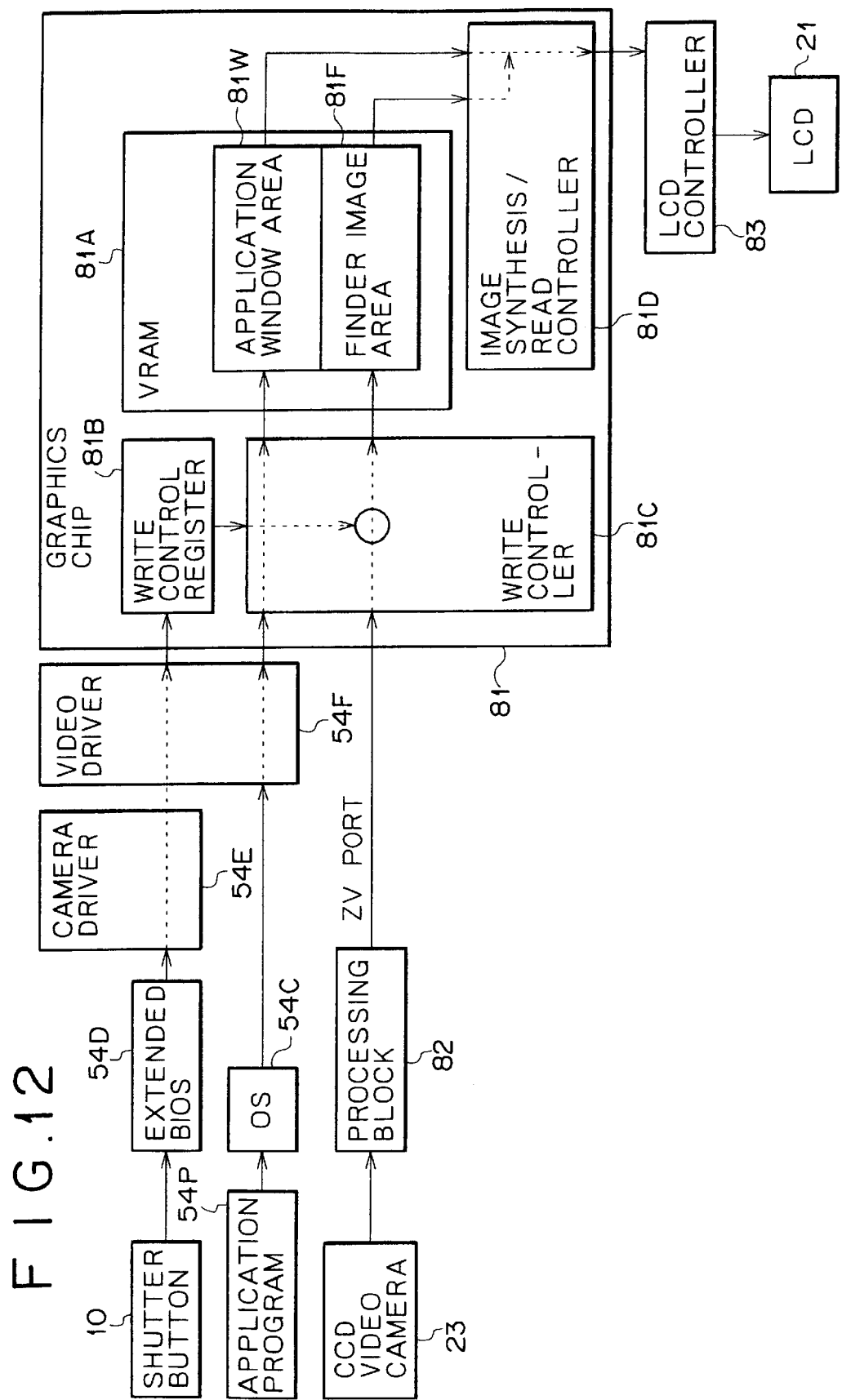
FIG. 12 illustrates a freeze operation of a graphics chip to be executed when the shutter button of the personal computer shown in FIG. 1 is pressed halfway.

Having received the operator event, the video driver 54F immediately writes a freeze command to a write control register 81B in the graphics chip 81 to temporarily stop writing of the image data to the VRAM 81A as shown in FIG. 12.

On the other hand, the graphics chip 81 is continuously supplied with drawing data for drawing the window 231 except for the finder screen 241 shown in FIG. 10 from the application program 54P through the OS 54C and the video driver 54F. The drawing data is sequentially written by a write controller 81C to an application window area 81W in the VRAM 81A.

The image data captured through the CCD video camera 23 is processed by the processing block 82 in a predetermined manner to be continuously supplied to the graphics chip 81.

However, the write control register 81B of the graphics chip 81 is written with the freeze command supplied from the video driver 54F. On the basis of the freeze command held in the write control register 81B, writing of the image data to a finder screen area 81F in the VRAM 81A by the write controller 81C is paused.

Therefore, the image data written to the finder screen area 81F in the VRAM 81A is held as it is when the freeze command is supplied from the video driver 54F.

An image synthesis/read controller 81D in the graphics chip 81 overlays the preview image data of a same frame repeatedly read from the finder screen area 81F onto the drawing data sequentially read from the application window area 81W in the VRAM 81A for drawing the window 231 (except for the finder screen 241). The image synthesis/read controller 81D continuously outputs the resultant synthesized image data to the LCD 21 through the LCD controller 83. Consequently, when the shutter button 10 has pressed halfway, the captured image is displayed in the frozen state on the finder screen 241 as shown in FIG. 10.

Figure 13:
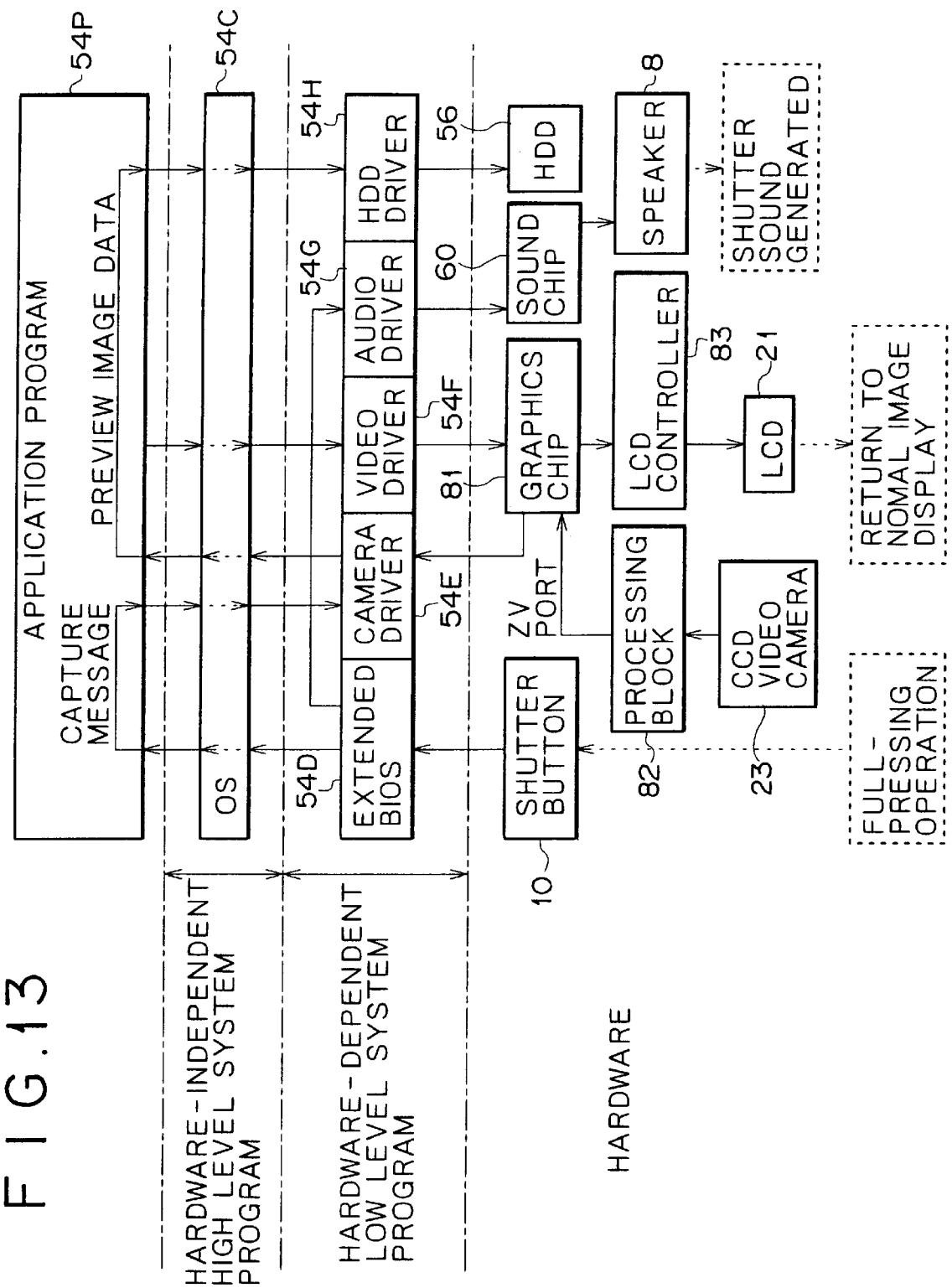
FIG. 13 illustrates the operation of components to be executed when the shutter button of the personal computer shown in FIG. 1 is pressed fully.

FIG. 13 illustrates the operations of the components to be executed when the shutter button 10 of the personal computer 1 shown in FIG. 1 is pressed fully. In the figure, when the shutter button 10 is pressed fully, the operator event of the full-press switch 86 (refer to FIG. 7) is detected by the extended BIOS 54D and the information about the operator event is directly supplied to the audio driver 54G. Receiving the operator event information, the audio driver 54G immediately controls the sound chip 60 to generate an artificial shutter sound ("click") from the speaker 8.

On the other hand, when the full-press operation of the shutter button 10 is detected by the extended BIOS 54D, the extended BIOS 54D sends a capture message to the application program 54P through the OS 54C. Upon receiving the capture message, the application program 54P sends a capture command to the camera driver 54E through the OS 54C. Further upon receiving the capture command, the camera driver 54E supplies the preview image data read from the finder screen area 81F in the VRAM 81A of the graphics chip 81 to the application program 54P through the OS 54C. The application program 54P converts the received preview image data into an image format, such as JPEG (Joint Photographic Coding Experts Group), appropriately adds a file name such as the date of shooting, and sends the resultant image data to the HDD driver 54H through the OS 54C. Accordingly, the image data is stored in a Still Viewer folder arranged in a predetermined directory on the HDD 56.

Thus, in synchronization with the half-pressing of the shutter button 10, the preview image is displayed in frozen manner in the finder screen 241 in the quick action mode. Further, in synchronization with the full-pressing of the shutter button 10, an artificial shutter sound is generated in the quick action mode. Then, the preview image is stored on the HDD 56 in the normal mode in which the application program 54P executes processing through the OS 54C.

The recording medium for use in installing the programs necessary for executing the above-mentioned series of processing operations onto the computer to make the programs ready for execution by the computer may be not only a package medium like a floppy disk, a CD-ROM, or a DVD (Digital Versatile Disk) but also a semiconductor memory or a magnetic disk for storing the programs temporarily or permanently. Also, the recording medium may be realized by a cable or wireless communications medium such as a LAN, the Internet, or digital satellite broadcasting or any of communications interfaces such as a router or a modem for transferring/receiving programs provided through such a communications medium. Namely, the recording medium as referred to herein is conceptual to include broader media including the above-mentioned media.

As mentioned above and according to the information processing apparatus, the information processing method, and the recording medium of the present invention, the hardware-dependent input means is provided with the quick action mode in which the event information associated with a user operation is directly supplied to another hardware-dependent means previously specified by the application program, thereby executing real-time control on the hardware. Consequently, the processing to be executed real-time in synchronization with the occurrence of an event can be cooperatively executed between the hardware-dependent programs (low-level system programs) such as BIOS's and drivers in a concluded manner, thereby preventing the delay in the OS processing to be executed in response to an operator event for example.

While the preferred embodiments of the present invention have been described using specific terms, such description is for illustrative purposes only, and it is to be understood that changes and variations may be made without departing from the spirit or scope of the appended claims.

What is claimed is:

1. An information processing apparatus comprising:
    an operator event detecting means for detecting a user operation and supplying first event information and second event information according to an amount of said user operation to a hardware-dependent input means;
    said hardware-dependent input means having a normal mode in which said second event information associated with said user operation is supplied to an application program through an operating system and a quick action mode in which said first event information is directly supplied to a hardware-dependent output means previously specified by said application program;
    wherein said hardware-dependent input means processes said first event information in said quick action mode and directly supplies the processed first event information to said hardware-dependent output means and, at the same time, processes said second event information in said normal mode and supplies the processed second event information to said application program through said operating system; and
    said hardware-dependent output means executing real-time control of hardware associated with the first event information upon reception of the first event information directly supplied from said hardware-dependent input means.

2. An information processing apparatus comprising:
    an operator event detecting means for detecting a user operation and supplying first event information and second event information according to an amount of said user operation to a hardware-dependent input means;
    said hardware-dependent input means having a normal mode in which a second event information associated with said user operation is supplied to an application program through an operating system and a quick action mode in which said first and second event information is directly supplied to respective first and second hardware-dependent output means previously specified by said application program
    wherein said hardware-dependent input means processes said first event information and said second event information in said quick action mode and directly supplies the processed first event information and the processed second event information to said first hardware-dependent output means and said second hardware-dependent output means, respectively, and at the same time, processes said second event information in said normal mode and supplies the processed second event information to said application program through said operating system; and
    said first hardware-dependent output means executing real-time control of hardware associated with the first event information upon reception of the first event information directly supplied from said hardware-dependent input means; and said second hardware-dependent output means executing real-time control of hardware associated with the second event information upon reception of the second event information directly supplied from said hardware-dependent input means.

3. The information processing apparatus according to claim 1, wherein said operator event detecting means outputs said first event information when a push button has been pressed halfway and outputs said second event information when said push button has been pressed fully.

4. The information processing apparatus according to claim 1, wherein:
    said hardware to be real-time controlled by said hardware-dependent output means consists of an image processing circuit for storing image information supplied from a CCD (charge-coupled-device) video camera into an image memory and outputting said image information read from said image memory onto a display means;

said hardware-dependent output means, upon reception of the event information directly supplied from said hardware-dependent input means, supplies a freeze command to said image processing circuit to temporarily stop writing of said image information into said image memory;

said image processing circuit, after reception of said freeze command, continuously outputs the image information of a same frame repeatedly read from said image memory to said display means to display a preview image.

5. The information processing apparatus according to claim 4, wherein said application program, upon reception of said second event information supplied from said hardware-dependent input means through said operating system, requests said image processing circuit through said hardware-dependent output means for reading the image information from said image memory and stores said image information read from said image memory into another storage means.

6. The information processing apparatus according to claim 1, wherein:

said hardware to be real-time controlled by said hardware-dependent output means consists of a sound processing circuit for generating an artificial shutter sound;

said hardware-dependent output means, upon reception of the event information directly supplied from said hardware-dependent input means, supplies a sounding command to said sound processing circuit to generate said artificial shutter sound; and said sound processing circuit, upon reception of said sounding command, generates said artificial shutter sound.

7. The information processing apparatus according to claim 2, wherein:

a hardware to be real-time controlled by said first hardware-dependent output means consists of an image processing circuit for storing image information supplied from a CCD (charge-coupled-device) video camera into an image memory and outputting the image information read from said image memory to a display means;

said first hardware-dependent output means, upon reception of said first event information supplied from said hardware-dependent input means, supplies a freeze command to said image processing circuit to temporarily stop writing of said image information into said image memory;

said image processing circuit, after reception of said freeze command, continuously outputs the image information of a same frame repeatedly read from said image memory to said display means to display a preview image; and a hardware to be controlled real-time by said second hardware-dependent output means consists of a sound processing circuit for generating an artificial shutter sound;

said second hardware-dependent output means, upon reception of said second event information directly supplied from said hardware-dependent input means, supplies a sounding command to said sound processing circuit to generate an artificial shutter sound; and said sound processing circuit, upon receiving said sounding command, generates said artificial shutter sound.

8. An information processing method comprising the steps of:

detecting a user operation and supplying first event information and second event information according to an amount of said user operation to a hardware-dependent input;

supplying and processing, in a quick action mode, said first event information directly to a hardware-dependent output previously specified by an application program; and supplying and processing, at the same time, in a normal mode, said second event information associated with said user operation to said application program through an operating system; and executing real-time control of hardware associated with said first event information upon reception by said hardware-dependent output of said first event information directly supplied by said hardware-dependent input.

9. An information processing method comprising the steps of:

detecting a user operation and supplying first event information and second event information according to an amount of said user operation to a hardware-dependent input;

supplying and processing, in a quick action mode, said first and second event information directly to respective first and second hardware-dependent outputs previously specified by an application program; and at the same time, supplying and processing, in a normal mode, said second event information associated with said user operation to said application program through an operating system; and executing real-time control of hardware associated with the first event information upon reception by said first hardware-dependent output of said first event information directly supplied by said hardware-dependent input; and executing real-time control of hardware associated with the first event information upon reception by said second hardware-dependent output of said first event information directly supplied by said hardware-dependent input.

* * * * *